(12) United States Patent
Niwa

(10) Patent No.: US 7,931,279 B2
(45) Date of Patent: Apr. 26, 2011

(54) METAL FIXTURE FOR DUST COVER

(75) Inventor: Hidekazu Niwa, Makinohara (JP)

(73) Assignee: NOK Corporation, Tokyo (JP)

( * ) Notice: Subject to any disclaimer, the term of this patent is extended or adjusted under 35 U.S.C. 154(b) by 272 days.

(21) Appl. No.: 11/989,305

(22) PCT Filed: Jul. 7, 2006

(86) PCT No.: PCT/JP2006/313538
§ 371 (c)(1),
(2), (4) Date: Jan. 24, 2008

(87) PCT Pub. No.: WO2007/057999
PCT Pub. Date: May 24, 2007

(65) Prior Publication Data
US 2009/0152822 A1    Jun. 18, 2009

(30) Foreign Application Priority Data

Nov. 21, 2005  (JP) .................... 2005-335451

(51) Int. Cl.
*F16J 15/02* (2006.01)
(52) U.S. Cl. ............................................. 277/630
(58) Field of Classification Search ........ 277/630, 277/634, 637, 616
See application file for complete search history.

(56) References Cited

U.S. PATENT DOCUMENTS

| | | | | |
|---|---|---|---|---|
| 4,276,759 A | * | 7/1981 | Faulbecker | 464/11 |
| 4,322,175 A | * | 3/1982 | Szczesny | 403/134 |
| 5,213,231 A | * | 5/1993 | Abplanalp et al. | 220/614 |

FOREIGN PATENT DOCUMENTS

| | | |
|---|---|---|
| JP | S60-158071 | 10/1985 |
| JP | S62-56866 | 4/1987 |
| JP | S62-80014 | 5/1987 |
| JP | H1-92518 | 6/1989 |
| JP | H2-54973 | 4/1990 |
| JP | H4-34510 | 3/1992 |
| JP | 04-125363 | 4/1992 |
| JP | H5-71543 | 9/1993 |
| JP | 09-152039 | 6/1997 |

OTHER PUBLICATIONS

International Search Report dated Oct. 3, 2006.

* cited by examiner

*Primary Examiner* — Shane Bomar
*Assistant Examiner* — Gilbert Y Lee
(74) *Attorney, Agent, or Firm* — Jacobson Holman PLLC

(57) ABSTRACT

An annular metal fixture is embedded in a dust cover and has an annular base portion and an inward peripheral tooth integrally formed at the inner side thereof. The annular base part is formed from one layer of flat plate and has a plurality of three-dimensional structures, which have projected portions usable as a height position defining element when inserted into a mold for forming the dust cover. A plurality of notches are circumferentially formed at the inner periphery of the inward peripheral tooth to increase the diameter of the inward peripheral tooth when fitted to the dust cover. The three-dimensional structures are formed at positions radially aligned with at least a part of the notches.

2 Claims, 4 Drawing Sheets

METAL FIXTURE FOR DUST COVER

This is a national stage of the International Application No. PCT/JP2006/313538 filed Jul. 7, 2006 and published in Japanese.

BACKGROUND OF THE INVENTION

1. Field of the Invention

The present invention relates to a metal fixture to be embedded in a dust cover so that the dust cover is attached to the installation place of a counterpart object.

2. Description of Conventional Art

As shown in FIG. 5, a dust cover 52 is commonly used for protectively sealing a swing mechanism of a ball joint 51, and a metal fixture 54 is embedded in the dust cover 52 at an outer periphery thereof so that the dust cover 52 is attached to a joint socket 53 as the counterpart of the dust cover 52 (refer to Patent Documents 1, 2, 3 and 4).

As shown in FIG. 6 in an enlarged scale, the metal fixture 54 is formed by press working, and the metal fixture 54 comprises an annular base portion 55 made by folding back of a metal sheet to have an approximately U-shape in cross section, and an inward peripheral tooth 56 formed at the inner circumference side of the base 55. The inward peripheral tooth 56 is formed integrally with the base 55 in a frustum shape in order to provide a fitting margin with respect to the joint socket 53.

Further, as shown in FIG. 7, when the dust cover made of a rubber-like elastic material is formed by means of a formation mold 57, the metal fixture 54 is inserted into the mold 57 and embedded into the dust cover 52 simultaneously with the formation of the dust cover 52 (insert molding).

Further, as shown in FIG. 6, the metal fixture 54 is embedded in the dust cover 52 at such a position that is apart in the axial direction from the end portion 52a at a distance d. Therefore, as shown in FIG. 7, a plurality of pins 58 are provided upright on the inner surface of the mold 57 to define the height position of metal fixture 54 such that the metal fixture 54 is disposed at a predetermined height position when the metal fixture 54 is inserted in the mold 57. Therefore, when the dust cover 52 is taken out from the mold 57 after the completion of molding, a plurality of concavities 59 are formed at the end face 52a of the dust cover 52 as a result of the pins 58 being pulled out, as the dust cover 52 is formed with the metal fixture 54 mounted on the pins 58.

However, the above-mentioned conventional art has some disadvantages as follows.

The annular base portion 55 of metal fixture 54 is made by folding back of a metal sheet to have an approximately U-shape in cross section as described above to maintain a predetermined mechanical strength, and thus has a volume of two layers of a metal sheet due to that shape. Therefore, there is disadvantage that weight of the metal fixture 54 as a whole is heavy. Recently, weight saving of components is carried forward rapidly in the industrial field of automobile and other general industrial machineries, and a dust cover 52 is not regarded as an exception.

Further, there is inconvenience that the mold has a complicated structure and thereby much labor and time are required for the maintenance of the mold, since a plurality of pins 58 are provided uprightly in the forming mold 57 as height position defining means of the metal fixture as described above.

The conventional arts are disclosed in, for example, Japanese unexamined utility model publication No. H01-92518, Japanese unexamined patent publication No. S62-56866, Japanese unexamined patent publication No. S62-80014, and Japanese unexamined utility model publication No. H04-34510.

SUMMARY OF THE INVENTION

In view of the above-mentioned problems, an object of the present invention is to provide a metal fixture for a dust cover, which is capable of realizing weight saving of components, and capable of simplifying the mold structure without pins provided as height position defining means of the metal fixture.

In order to achieve the above-mentioned object, according to a first aspect of the present invention, an annular metal fixture, which is to be embedded in a dust cover so that the dust cover is attached to the installation place of counterpart object, is formed from one layer of a flat plate and has a plurality of three-dimensional structures formed partially on the circumference thereof. The three-dimensional structures are provided with projected portions usable as height position defining means when the metal fixture is inserted in a mold for forming the dust cover.

Further, according to a second aspect of the present invention, an annular metal fixture, which is to be embedded in a dust cover so that the dust cover is attached to the installation place of counterpart object, integrally has an annular base portion and inward peripheral tooth formed at the inner circumference side of the annular base portion. The annular base portion is formed from one layer of a flat plate, and has a plurality of three-dimensional structures formed partially on the circumference thereof. The three-dimensional structures are provided with projected portions usable as height position defining means when the metal fixture is inserted in a mold for forming the dust cover.

Further, according to a third aspect of the present invention, a metal fixture of the second aspect further includes a plurality of notches provided circumferentially on an inner periphery of the inward peripheral tooth in order to increase the diameter of inward peripheral tooth when fitted to the dust cover, and the three-dimensional structures are formed at positions radially aligned with at least a part of the notches.

In the metal fixture provided with the above-mentioned structure according to the first aspect of the present invention, as the metal fixture is formed from one layer of a flat plate and has a plurality of three-dimensional structures formed partially on the circumference thereof, the metal fixture can be formed to have a volume of one layer of a metal plate as a whole. Further, as the three-dimensional structures can be formed by means of embossing or the like, the metal fixture can be formed without increasing the volume as a whole, even if the three-dimensional structures are provided. Furthermore, as the three-dimensional structures can be provided with projected portions usable as height position defining means when the metal fixture is inserted in the forming mold of the dust cover, the projected portions can be the alternatives to pins, thereby the metal fixture can be placed in predetermined height position, even if the mold has no pins or projections.

In the metal fixture provided with the above-mentioned structure according to the second aspect of the present invention, as the annular base portion of the metal fixture is formed from one layer of a flat plate and has a plurality of three-dimensional structures formed partially on the circumference thereof, the annular base portion can be formed to have a volume of one layer of a metal plate. Further, as the three-dimensional structures can be formed by means of embossing or the like, the annular base portion of the metal fixture can be formed without increasing the volume, even if the three-dimensional structures are provided. Furthermore, as the three-dimensional structures can be provided with projected portions usable as height position defining means when the metal fixture is inserted in the forming mold of the dust cover, the projected portions can be the alternative to pins, thereby the metal fixture can be placed in predetermined height position, even if the mold has no pins or projections.

The inward peripheral tooth provided at the inner circumference side of the annular base portion provides a fitting margin with respect to the installation place by the plate spring function thereof, therefore, a high degree of accuracy is required for the dimension of the tooth tip portion (dimension of inside diameter). On this point, in the case that a plurality of three-dimensional structures are formed partially on the circumference of the metal fixture or the annular base portion, deformation often extends to the periphery thereof and dimensional error may easily occur in the tooth tip portion. To this effect, the metal fixture according to the third aspect of the present invention has a plurality of three-dimensional structures provided at positions radially aligned with at least a part of the notches so that the notched portions in the tooth tip portion do not take part in providing the fitting margin. This is due to an idea that the inner diameter of the notched portions in the tooth tip portion increases by the presence of the notches and the notched portion becomes not to take part in providing the fitting margin, thereby no problem occurs even if deformation caused by the formation of the three-dimensional structures extends to the notched portion to produce the dimensional error.

EFFECTS OF THE INVENTION

The present invention has the following advantageous effects.

The metal fixture according to the first aspect of the present invention is formed to have a volume of one layer of a metal plate, since it is formed from one layer of a flat metal plate and has a plurality of three-dimensional structures formed partially on the circumference thereof. The three-dimensional structures can be formed by means of embossing or the like, so the volume of the metal fixture cannot be increased by the provision of three-dimensional structures. Thus, it becomes possible to lighten and downsize the metal fixture according to the present invention as compared with the conventional one.

Furthermore, as the three-dimensional structures can be provided with projected portions available as height position defining means when the metal fixture is inserted in the mold for forming the dust cover, the metal fixture can be placed in predetermined height position even if the mold has no pins. Thus, it becomes possible not to provide pins in the mold for forming the dust cover, thereby the structure of the mold can be simplified.

Further, in the metal fixture according to the second aspect of the present invention, the annular base portion is formed to have a volume of one layer of a metal plate, as the annular base portion of the metal fixture is formed from one layer of a flat metal plate and has a plurality of three-dimensional structures formed partially on the circumference thereof. The three-dimensional structures can be formed by means of embossing or the like, so the volume of the metal fixture cannot be increased by the provision of three-dimensional structures. Thus, it becomes possible to lighten and downsize the metal fixture according to the present invention as compared with the conventional one.

Furthermore, as the three-dimensional structures can be provided with projected portions available as height position defining means when the metal fixture is inserted in the mold for forming the dust cover, the metal fixture can be placed in predetermined height position even if the mold has no pins. Thus, it becomes possible not to provide pins in the mold for forming the dust cover, thereby the structure of the mold can be simplified.

Further, in the metal fixture according to the first and second aspects of the present invention, as the three-dimensional structures and projected portions are provided, when a plurality of metal fixtures are collectively immersed into an adhesive containing tank in the adhesive coating process prior to the dust cover forming process, close contact of the metal fixtures to one another due to the viscosity of an adhesive is prevented. At this time, the projections serve as spacers for separating the metal fixtures.

Furthermore, in the metal fixture according to the third aspect of the present invention, as the three-dimensional structures are provided at positions radially aligned with at least a part of the notches, the notched portions in the tooth tip portion are configured as regions of not taking part in providing the fitting margin. Therefore, deformation caused by the provision of three-dimensional structures is prevented from affecting the fitting margin, and the metal fixture can be provided with highly accurate fitting margin of the inward peripheral tooth regardless of the provision of three-dimensional structures.

BRIEF EXPLANATION OF DRAWINGS

FIG. 1(A) is a plan view of the metal fixture, and FIG. 1(B) is a sectional view taken along the lines B-O-B in FIG. 1(A);

DETAILED DESCRIPTION OF PREFERRED EMBODIMENTS

One embodiment of the present invention will now be described with reference to the drawings.

Figure 1A:
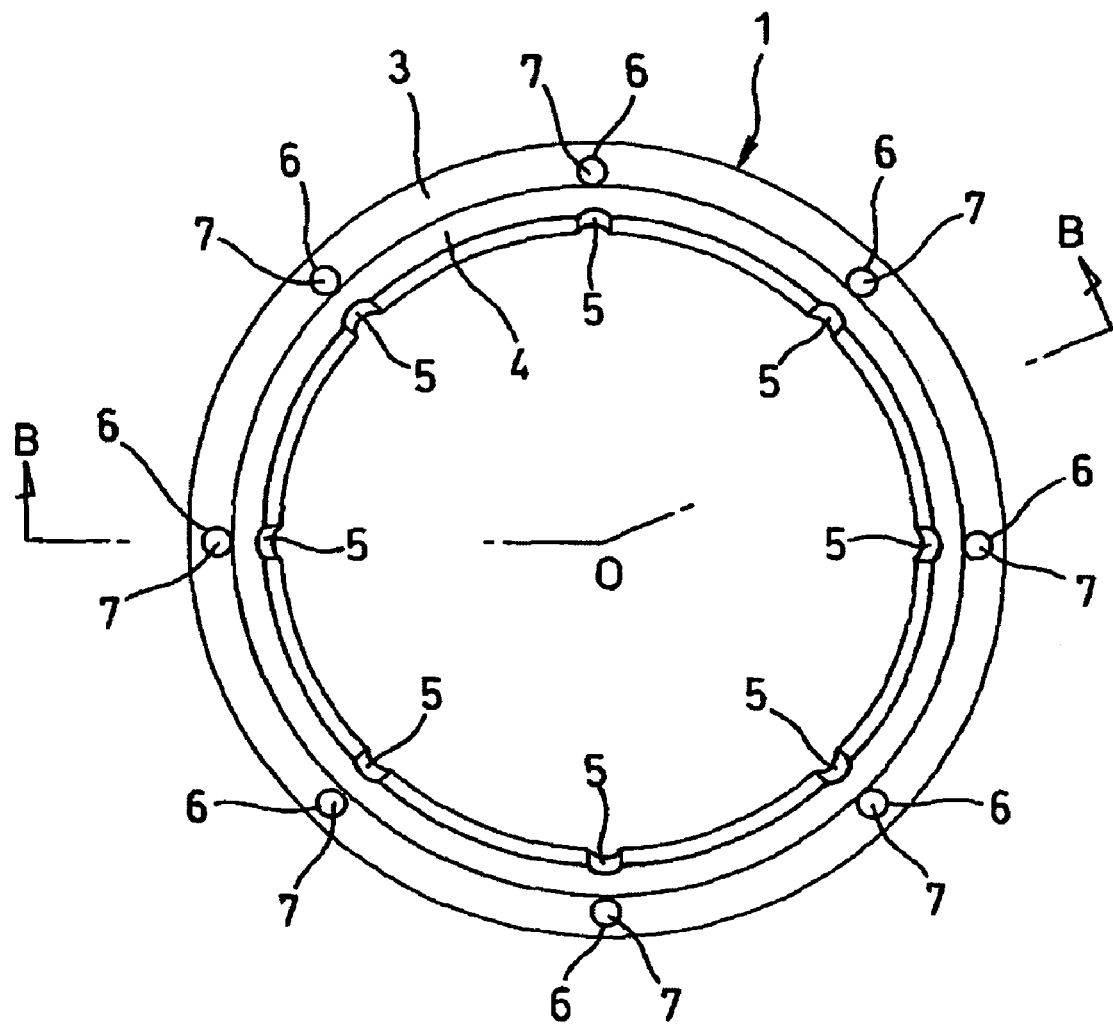
FIGS. 1(A) and 1(B) show one embodiment of a metal fixture according to the present invention, where
Figure 1B:
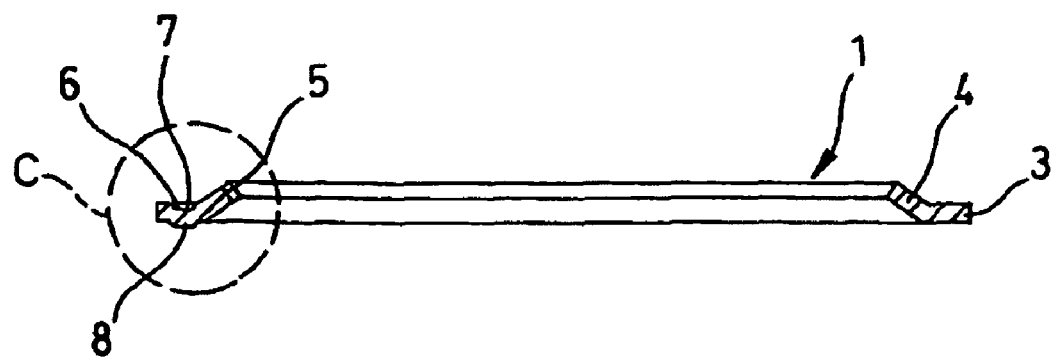
Figure 2:
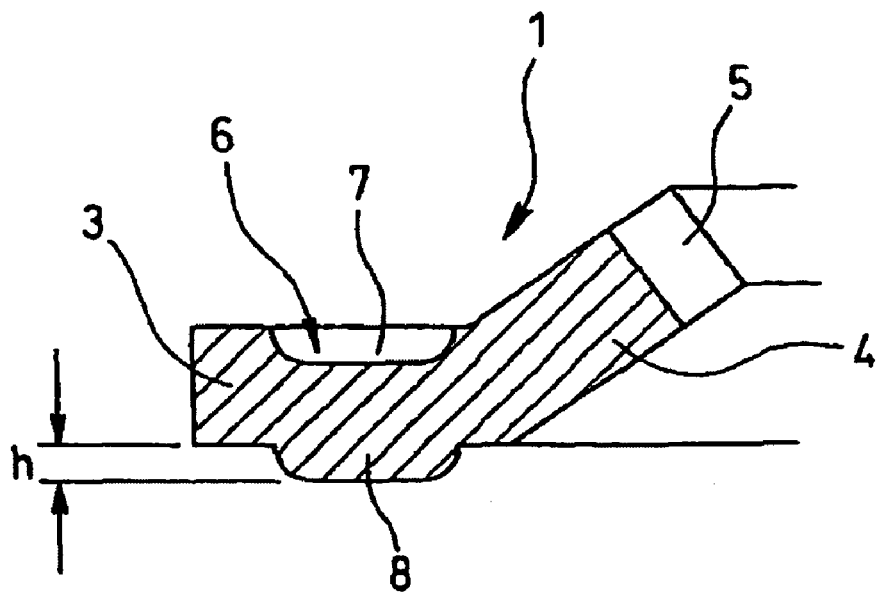
FIG. 2 is an enlarged sectional view of the main part of metal fixture illustrated in a circle C in FIG. 1(B)
Figure 3:
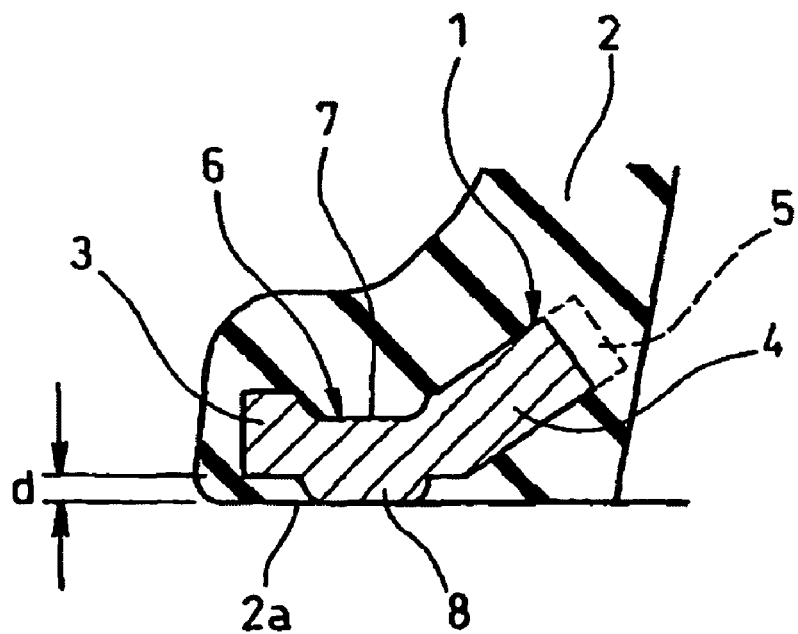
FIG. 3 is an enlarged sectional view illustrating a state of the metal fixture being embedded in a dust cover.

FIGS. 1(A) and 1(B) show one embodiment of a metal fixture 1 according to the present invention, where FIG. 1(A) is a plan view of the metal fixture, and FIG. 1(B) is a sectional view taken along the lines B-O-B in FIG. 1(A). Further, FIG. 2 is an enlarged sectional view of the main part of metal fixture 1 illustrated in a circle C in FIG. 1(B), and FIG. 3 is an enlarged sectional view illustrating a state of the metal fixture 1 being embedded in a dust cover 2.

The metal fixture 1 according to the embodiment is embedded at one end of a dust cover 2 for a ball-joint so that the dust cover 2 is attached to a peripheral stepped portion of a joint socket which is a counterpart object of attaching the dust cover 2, and is constructed as follows.

The metal fixture 1 is formed from a metal plate (annular steel plate) by press working to be in an annular shape as a whole, and has an annular base portion 3. An inward peripheral tooth 4 in a frustum shape is integrally formed on an inner periphery of the annular base portion 3 in order to provide a fitting margin with respect to the joint socket. Further, a plurality of notches 5 are formed circumferentially on a tooth tip portion at the inner periphery of the inward peripheral tooth 4 at the equal intervals (eight notches are shown in the drawing) so that the diameter of the inward peripheral teeth 4 is increased to effect plate spring function when fitted to the dust cover.

The annular base portion 3 is formed from one layer of a flat plate and the annular inward peripheral tooth 4 formed integrally with the annular base portion 3 at the inner circumference side thereof is also formed from one layer of a flat plate, therefore, the metal fixture 1 is formed to have a volume of one layer of a metal plate as a whole.

The plate shaped annular base portion 3 has a plurality of three-dimensional structures 6 formed circumferentially at the equal intervals (eight three-dimensional structures are shown in the drawing), and as shown in the drawings, each of three-dimensional structure 6 is formed as a half stamped concave-and-convex structure having a combination of concave portion 7 formed on the upper surface of the annular base portion 3 and projected portion 8 on the lower surface thereof. The three-dimensional structures 6 having combinations of concave portions 7 and projections 8 are formed by embossing or the like.

Further, the projected portions 8 forming a part of the three-dimensional structures 6 are usable as height position defining means when the metal fixture 1 is inserted into the mold for forming the dust cover in the process of forming the dust cover. To this effect, a height dimension h (FIG. 2) is established so as to be substantially same as a distance d (FIG. 3) at which the metal fixture 1 should be apart in the axial direction from the end surface 2a of the dust cover 2.

Further, the three-dimensional structures 6 are formed at positions radially aligned with the notches 5. In this embodiment as shown in the drawing, the three-dimensional structures 6 are provided in the same number as that of the notches 5, accordingly the notches 5 are formed at positions radially inwardly aligned with the three-dimensional structures 6. However, in case of the number of three-dimensional structures 6 and notches 5 being different, the three-dimensional structures 6 are formed at positions radially aligned with at least a part of the notches 5. For example, when eight three-dimensional structures 6 (at equal intervals) and sixteen notches 5 (at equal intervals) are provided, eight three-dimensional structures 6 and eight notches 5 are positioned radially aligned with each other. Therefore, the remaining eight notches 5 are not formed at positions radially inwardly aligned with the three-dimensional structures 6. Such configurations are to be included in the scope of the present invention.

The metal fixture 1 having the structure as described above is embedded at one end portion of the dust cover 2 as shown in FIG. 3, and this end portion of the dust cover 2 is attached on the outer circumference of the joint socket by the fitting margin established at the inward peripheral tooth 4. Accordingly, the metal fixture of the present invention is characterized in achieving the following operations and effects by the above-mentioned structure.

First, since the annular base portion 3 is formed from one layer of a flat plate, and the annular inward peripheral tooth 4 is also formed from one layer, the metal fixture 1 is formed from one layer as a whole, i.e. the metal fixture 1 is formed to have a volume of one layer of a metal plate. Thus, it becomes possible to realize weight-saving and downsizing of the metal fixture 1 according to the present invention as compared with the conventional one. If there is concern that rigidity of the metal fixture 1 might be reduced as compared with the conventional double layer structure of the metal plate, it is cleared up by increasing the thickness of the metal plate. Even in this case, increasing rate of the plate thickness is sufficiently to be 20 to 30% (for example, the plate thickness is increased from 0.8 mm to 11.0 mm), therefore, weight-saving and downsizing of the metal fixture cannot be prevented.

As the metal fixture 1 is provided with a plurality of three-dimensional structures 6 formed at equal intervals to have a combination of concave portion 7 and projected portions 8, and the projected portions 8 act as height position defining means when the metal fixture 1 is inserted into the mold for forming the dust cover, it is possible to keep the metal fixture 1 at a predetermined height position without providing the pins in the mold for forming the dust cover 2 having the metal fixture 1 as a constituent part. Therefore, it is possible to omit the pins from the dust cover forming mold, thereby the mold structure can be simplified.

Further, since the metal fixture 1 has three-dimensional structures 6 including projected portions 8, when a plurality of the metal fixtures 1 are collectively immersed into an adhesive containing tank in the adhesive coating process prior to the dust cover forming process, close contact of the metal fixtures 1 to one another due to the viscosity of adhesive can be prevented. At this time, the projected portions 8 act as spacers for separating the metal fixtures 1.

Further, as shown in FIG. 3, the projected portions 8 are disposed in the dust cover 2 so that the planar portions of the lower surfaces of projected portions 8 are flush with the end surface 2a of the dust cover 2. Accordingly, there are formed no concavities at the end surface 2a of the dust cover 2, while the conventional dust cover has the concavities formed as a result of the pins being pulled out. For the conventional dust cover, when it is attached to the ball joint, the end surface 52a of the dust cover 52 contacts the joint socket so that the concavities are covered with the socket. Therefore, if muddy water comes into the concavities, it tends to stay there so that the metal fixture 54 might rust easily. On this point, according to the metal fixture 1 of the embodiment, no muddy water stays at the end surface 2a of the dust cover 2, as the concavities are not formed there.

Figure 4:
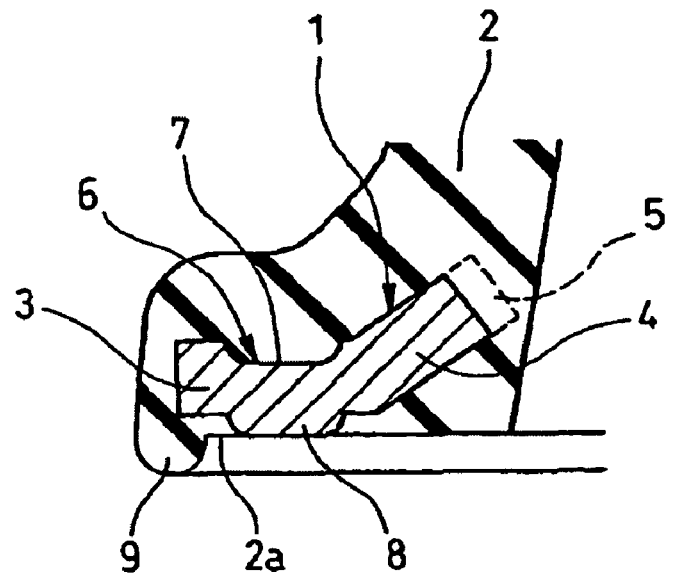
FIG. 4 is an enlarged sectional view of a main part of the other embodiment of the present invention.
Figure 5:
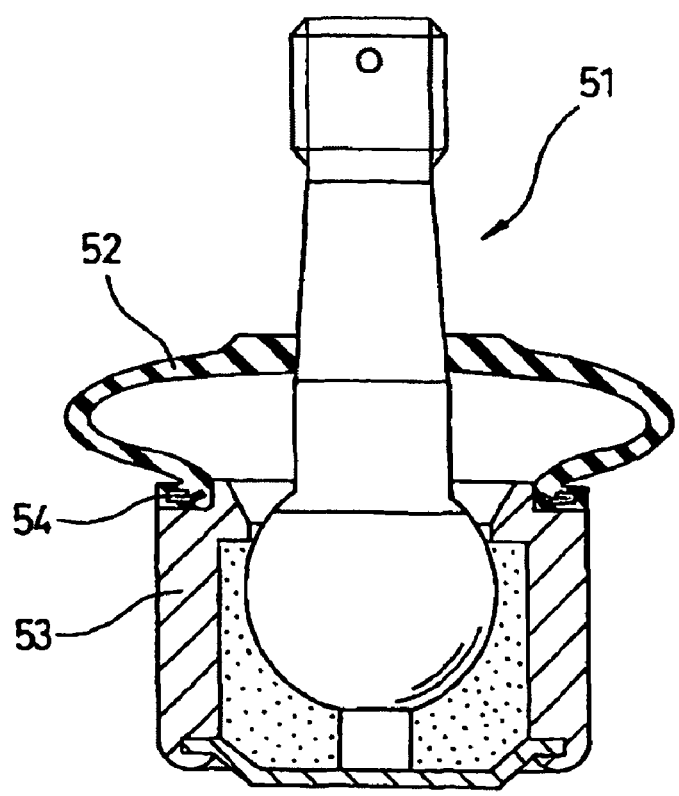
FIG. 5 is a sectional view of a ball joint illustrating a state of the conventional metal fixture being applied therewith.
Figure 6:
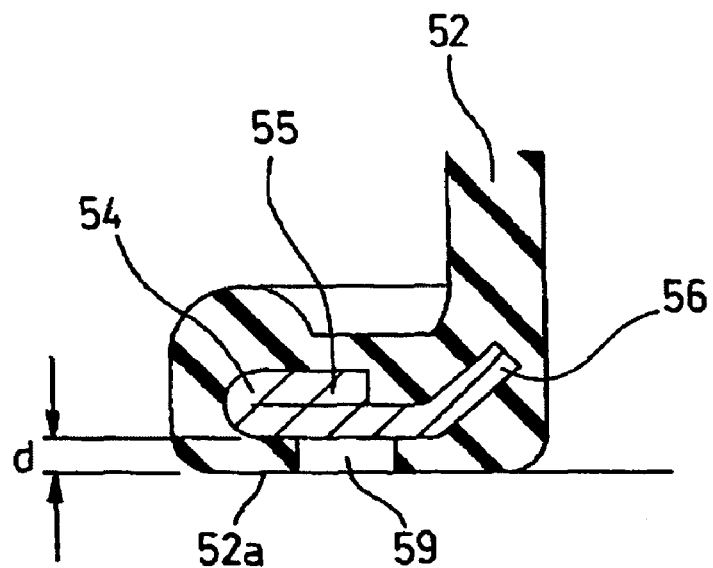
FIG. 6 is an enlarged sectional view of a main part of the conventional metal fixture being embedded in a dust cover.
Figure 7:
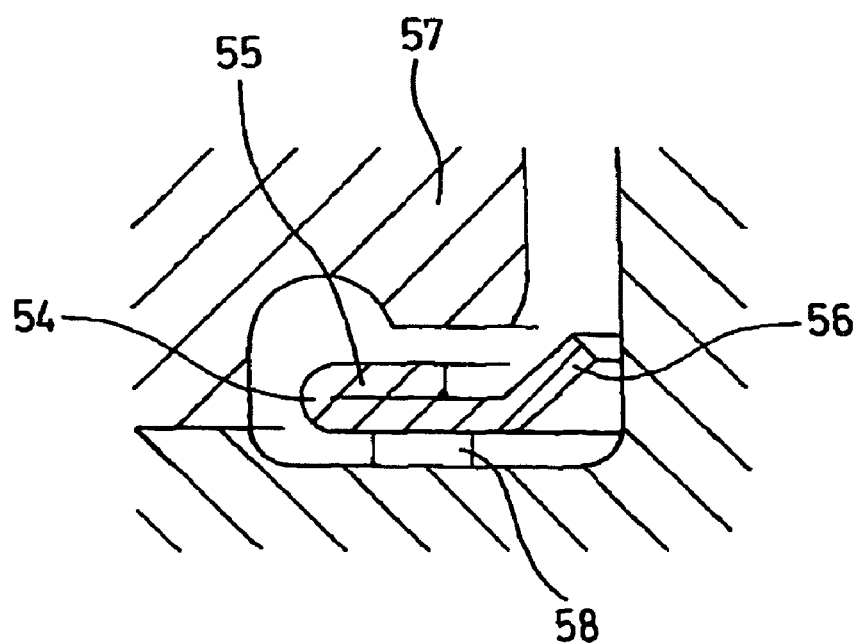
FIG. 7 is a sectional view of a main part of a forming mold illustrating a forming process of the dust cover.

In the case where the lower surfaces of the projected portions 8 are configured to be flush with the end surface 2a of the dust cover 2, there is the possibility that when the dust cover 2 is attached to the joint socket, the projected portions 8 prevent compression of rubber portion (indicated by an alphabetic letter d in FIG. 3) of the dust cover end surface 2a so that the muddy water may enter into the clearance between the dust cover end surface 2a and the socket. Therefore, in order to avoid this, it is preferable to form an annular sealing projection 9 on the outer peripheral portion of the dust cover end surface 2a as shown in FIG. 4.

Furthermore, while the inward peripheral tooth 4 is configured to define the fitting margin with respect to the joint socket by the plate spring elasticity, portions where the notches 5 are formed in the tooth tip portion do not take part in providing the fitting margin, as the notches 5 formed at the tooth tip portion of the inward peripheral tooth 4 are positioned radially inward from the three-dimensional structures 6. Those portions are liable to be influenced by deformation caused by formation of the three-dimensional structures and may have a dimensional error to give an influence on the provision of fitting margin, since the portions are positioned radially inward from the three-dimensional structures 6. In the present invention, as the portion where the notches are formed configured as a region of not taking part in providing the fitting margin, the formation of the three-dimensional structures 6 has no effect on the provision of fitting margin. Therefore, the metal fixture 1 can be surely provided with highly accurate fitting margin of the inward peripheral tooth.

What is claimed is:

1. An annular metal fixture to be embedded in a dust cover so that the dust cover is attached to a counterpart object, the annular metal fixture comprising
one layer of a metal plate, the metal plate including a flat annular base portion and an inclined peripheral tooth portion extending radially inwardly and upwardly from the flat annular base portion, the annular base portion having a plurality of three-dimensional structures formed partially on a circumference thereof, and the three-dimensional structures being provided with downward projected portions usable as a height position defining element when the metal fixture is inserted into a mold for forming the dust cover,
a plurality of notches provided circumferentially on an inner periphery of the inclined peripheral tooth portion, the three-dimensional structures being positioned radially aligned with the notches.

2. An annular metal fixture to be embedded in a dust cover so that the dust cover is attached to a counterpart object, said annular metal fixture comprising
an annular base portion and an inclined, inward peripheral tooth portion integrally formed at an inner circumference side of the annular base portion,
the annular base portion being formed from one layer of a flat plate and having a plurality of three-dimensional structures formed partially on a circumference thereof,
the three-dimensional structures being provided with downward projected portions usable as a height position defining element when the metal fixture is inserted into a mold for forming the dust cover,
a plurality of notches being provided circumferentially on an inner periphery of the inward peripheral tooth portion to increase a diameter of the inward peripheral tooth portion when fitted to the dust cover, and the three-dimensional structures being positioned radially aligned with the notches.

* * * * *